No. 647,244. Patented Apr. 10, 1900.
J. C. ANDERSON.
AUTOMOBILE VEHICLE.
(Application filed July 31, 1899.)
(No Model.) 6 Sheets—Sheet 1.
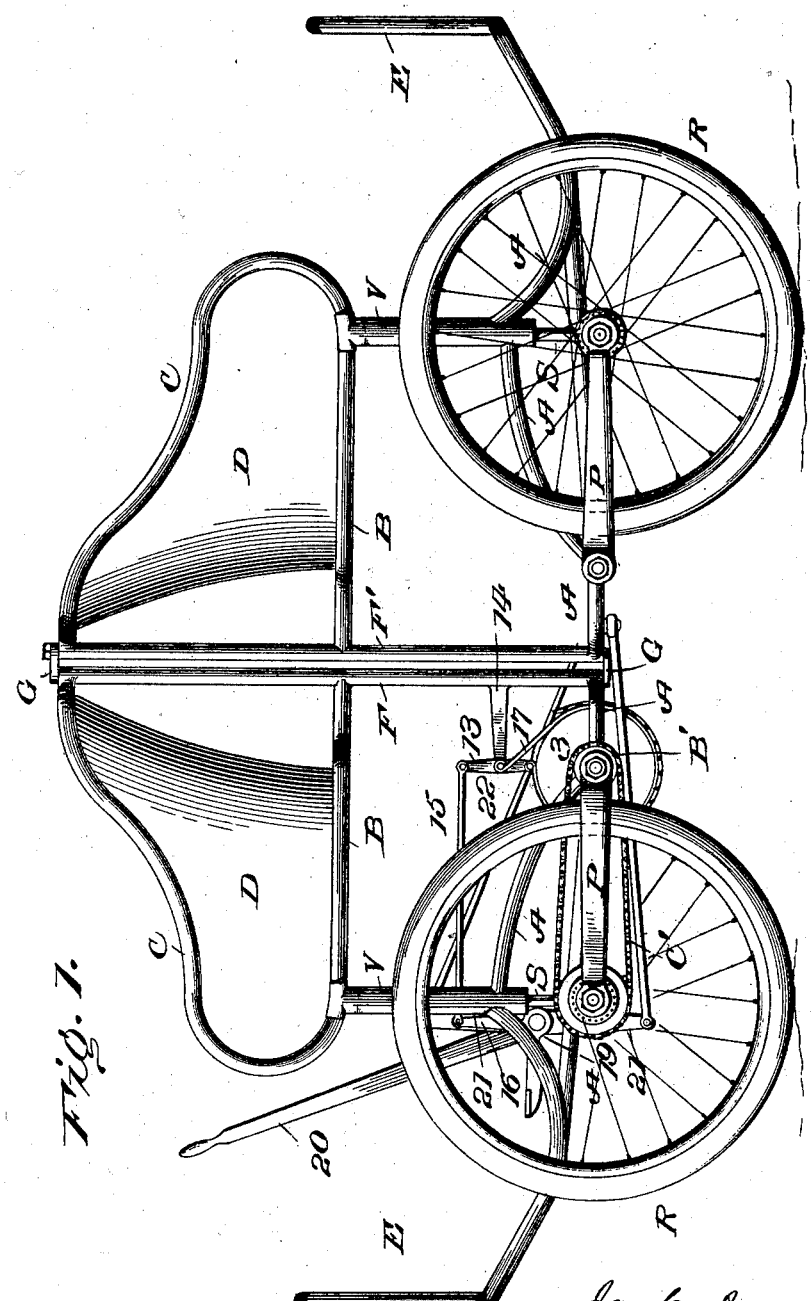

No. 647,244. Patented Apr. 10, 1900.
J. C. ANDERSON.
AUTOMOBILE VEHICLE.
(Application filed July 31, 1899.)
(No Model.) 6 Sheets—Sheet 2.
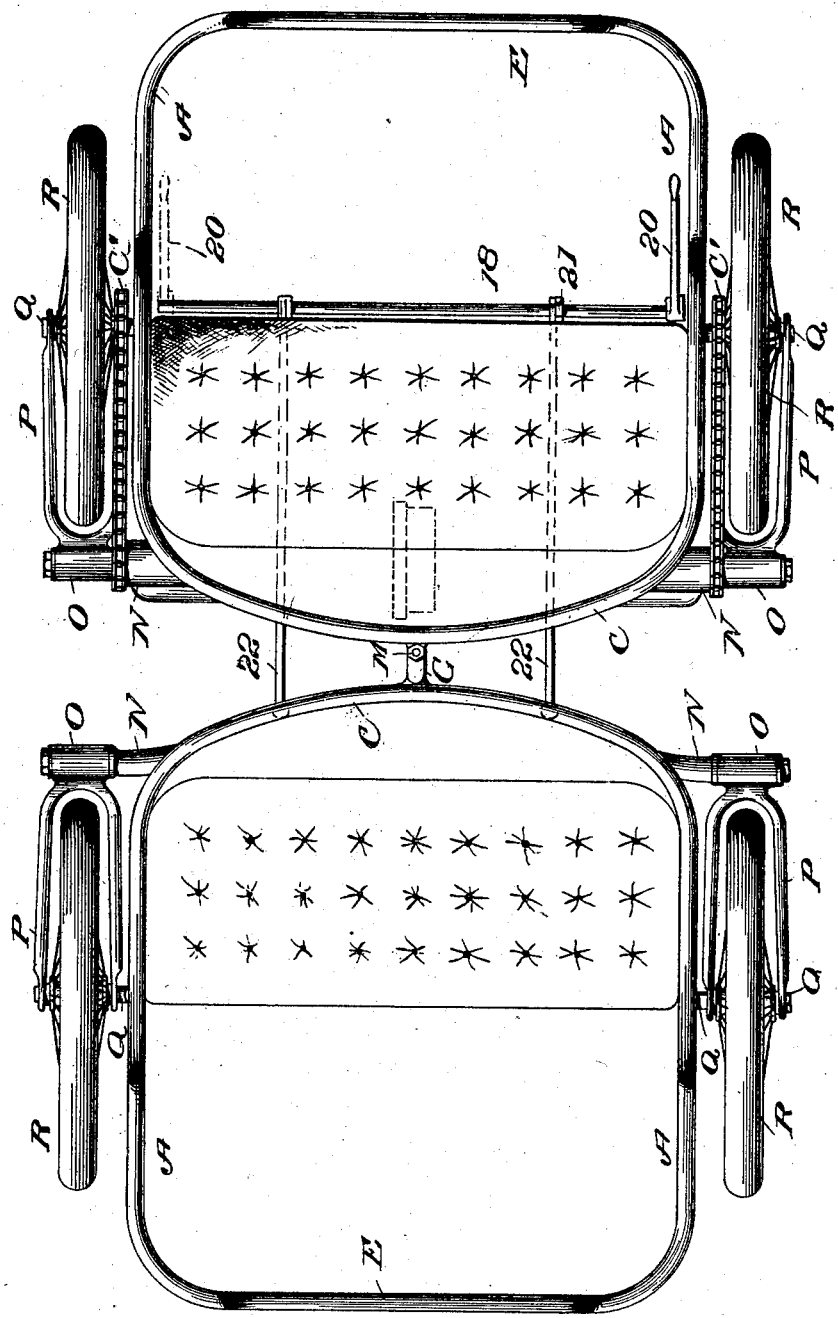

No. 647,244. Patented Apr. 10, 1900.
J. C. ANDERSON.
AUTOMOBILE VEHICLE.
(Application filed July 31, 1899.)
(No Model.) 6 Sheets—Sheet 3.
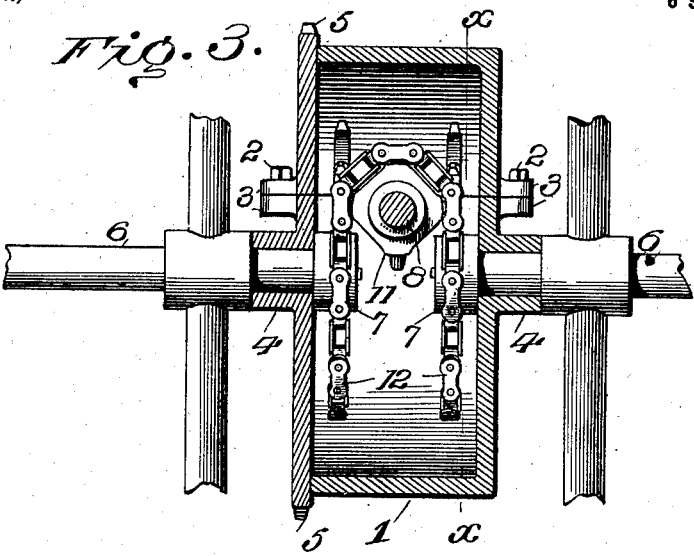
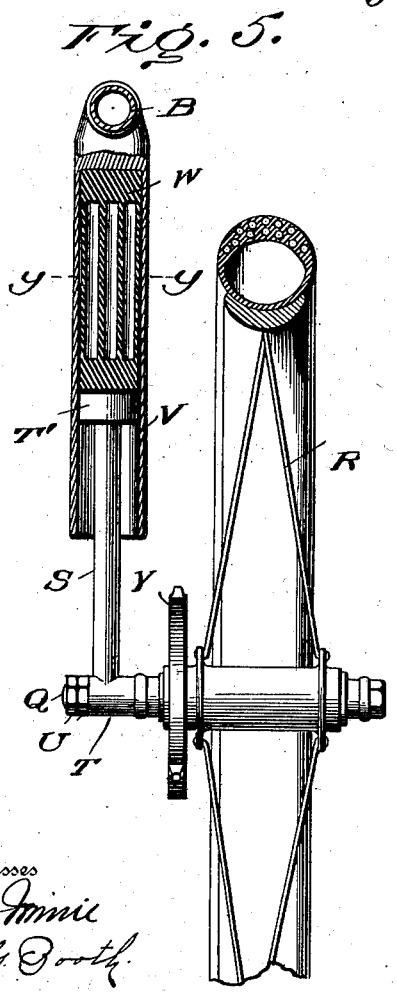
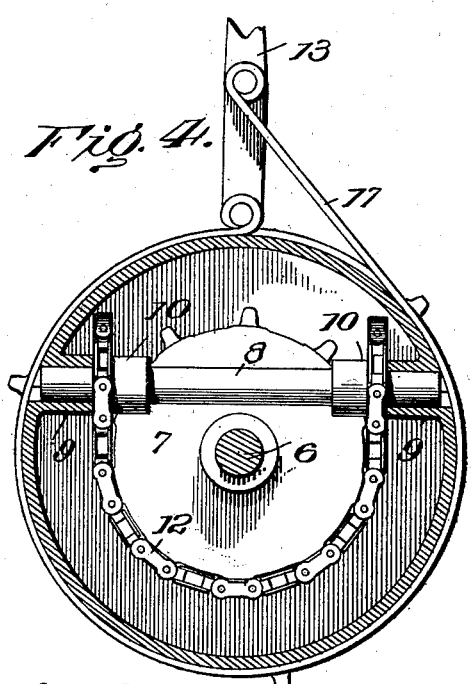
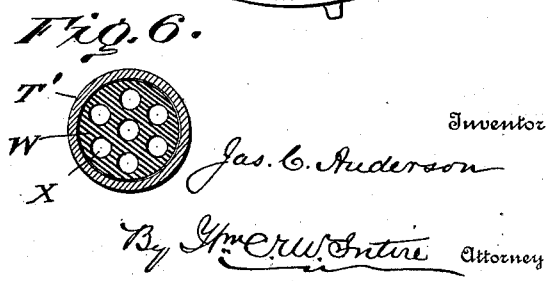

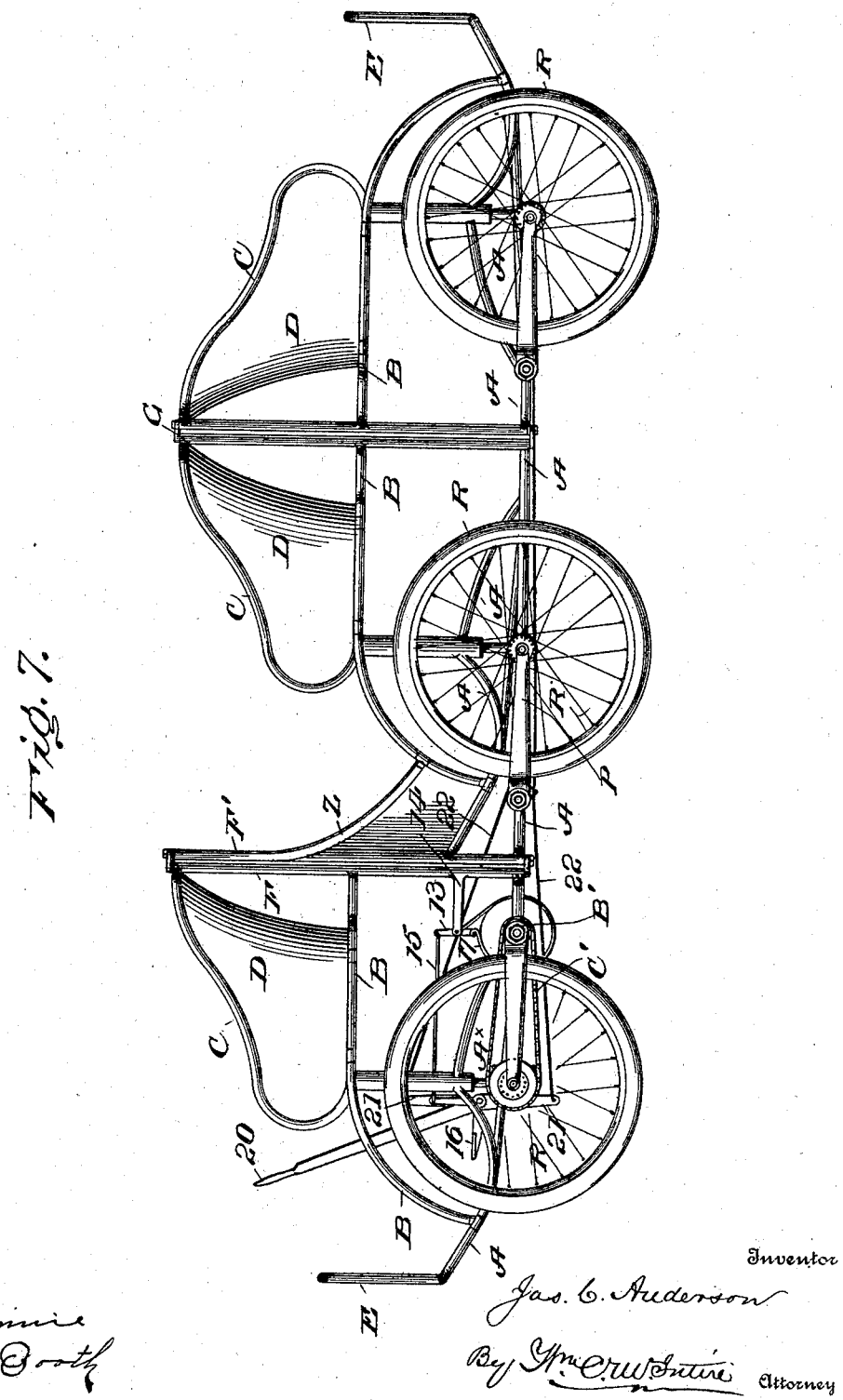

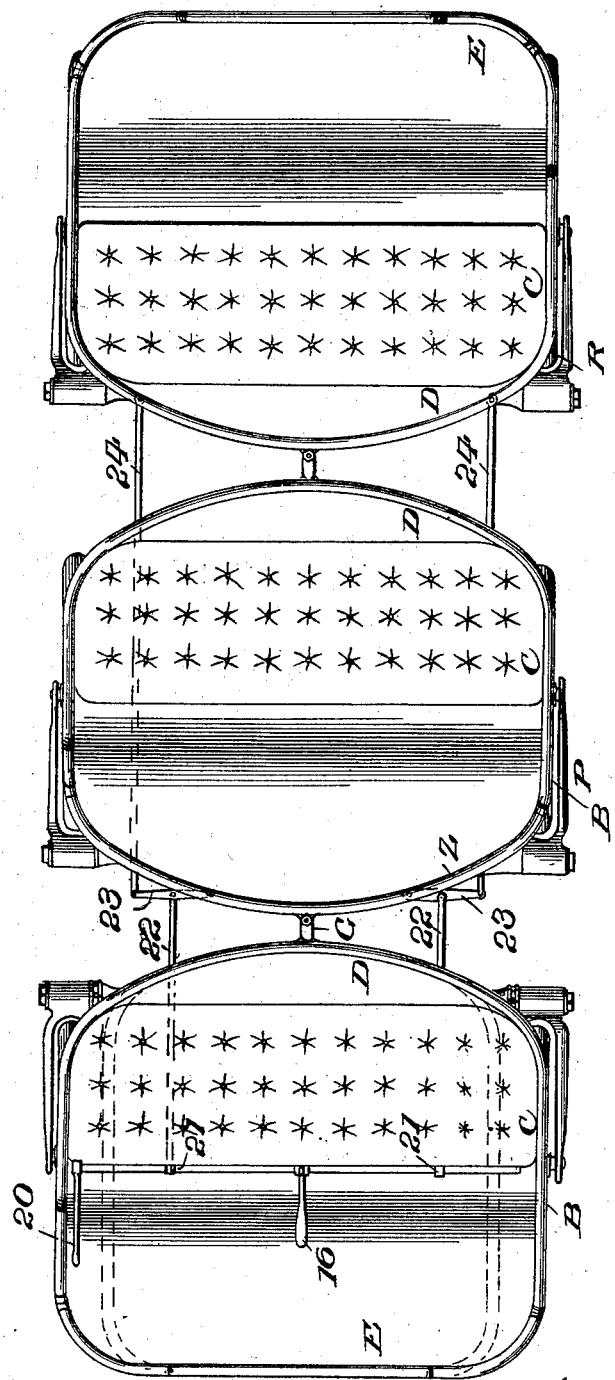

No. 647,244. Patented Apr. 10, 1900.
J. C. ANDERSON.
AUTOMOBILE VEHICLE.
(Application filed July 31, 1899.)
(No Model.) 6 Sheets—Sheet 6.
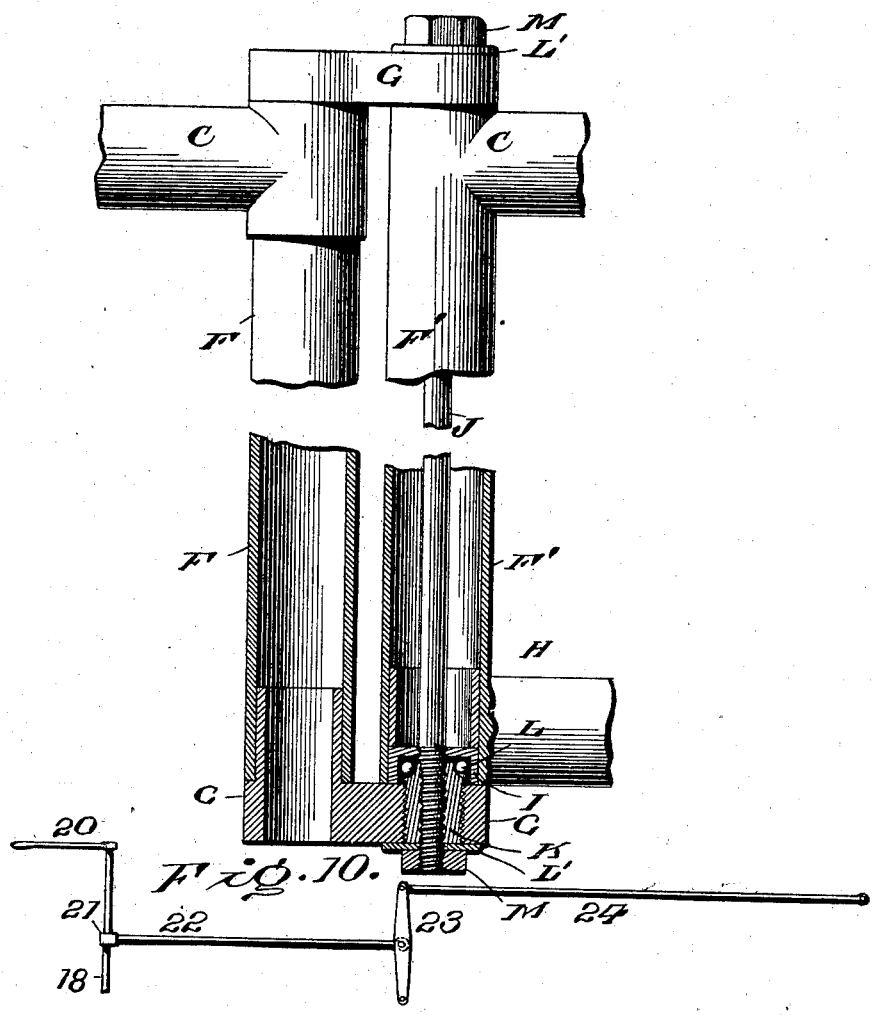

UNITED STATES PATENT OFFICE.

JAMES C. ANDERSON, OF HIGHLAND PARK, ILLINOIS.

AUTOMOBILE VEHICLE.

SPECIFICATION forming part of Letters Patent No. 647,244, dated April 10, 1900.

Application filed July 31, 1899. Serial No. 725,665. (No model.)

*To all whom it may concern:*

Be it known that I, JAMES C. ANDERSON, a citizen of the United States, residing at Highland Park, in the county of Lake and State of Illinois, have invented certain new and useful Improvement in Automobile Vehicles; and I do hereby declare the following to be a full, clear, and exact description of the invention, such as will enable others skilled in the art to which it appertains to make and use the same.

My invention relates to certain new and useful improvements in construction and arrangement of automobile carriages.

In the present state of the art all steps made in the progress thereof have apparently been controlled by the conception that the vehicle proper should be heavy and strong in order to sustain the weight of the passenger load supplemented by excessive weight of the motor or the motive force, and hence all automobiles with which I am familiar involve great weight and expensive construction and in addition are mounted high in the air upon expensive and heavy steel springs and axles and have the general appearance of cumbersome and uncomfortable vehicles. In addition to the peculiarities and disadvantages of construction referred to there is another, viz: It being recognized that in automobiles the motive force must of necessity be applied directly to the wheels instead of horizontally, as is the case with an ordinary carriage propelled or drawn by animal power, it has become necessary to dispense with the fifth-wheel and king-bolt of ordinary vehicles employed for securing changes in the direction of travel and to employ means for turning the forward wheels upon a vertical axis. This action subjects the tires of such vehicles to a torsional and twisting strain, which soon impairs the tires and renders frequent repair and renewal necessary. Another very serious disadvantage in the present construction of automobiles lies in the fact that the propelling machinery is very noisy and is considered a great nuisance, not only by the passengers riding in the vehicle, but also by the general public. This excessive noise is due in a large degree to the fact that in the sprocket-wheels employed in connection with the sprocket-chains the entire peripheries of the wheels are armed with a multiplicity of sprocket-teeth and each and every link of the chains passed onto and off of the sprocket during each traverse of the chain. This action involves frictional touches between the sprockets and chain-links to such an extent as to produce the unpleasant buzzing noise complained of. These frictional touches also add largely to the wear of the chain and to such an extent that in many instances cogged gearing has been substituted; but while this mode of transmitting power is more economical from the standpoint of wear referred to it also involves the production of noises.

My invention has for one object to overcome all of the disadvantages involved in the ordinary construction and to produce an automobile which, while being adequately strong and durable, shall be exceedingly light and economic of construction and requiring less motive force to propel the same.

It has for a further object to provide an automobile which shall be low to the ground, easily propelled, and rendered capable of a change of direction by the articulation of the frame of the vehicle rather than the axle or wheels.

It has for a further object to provide an automobile the capacity of which may be increased by the addition of longitudinal sections.

It has for a further object to provide a novel means for securing the necessary yielding or spring action of the vehicle and at the same time to adapt it to travel with greater facility than ordinary vehicles over road-beds of uneven and irregular surfaces either in longitudinal or transverse profile.

With these ends in view my invention consists in the details of construction and the combination and arrangement of parts hereinafter more fully described.

In order that those skilled in the art to which my invention appertains may know how to make my improved automobile and fully understand all of its advantages, I will proceed to describe the same, referring by letters and numerals to the accompanying drawings, in which—

Figure 1 represents a side elevation of an automobile embodying the features of my invention; Fig. 2, a top or plan view; Fig. 3, a detail view, on enlarged scale, partly in plan and partly in section, of the power-transmitting shafts and intermediate mechanism by means of which differential speed may be given to the driving-wheels on each side of the vehicle. Fig. 4 is a transverse section on the line $x\ x$ of Fig. 3 and showing the brake mechanism. Fig. 5 is a detail view, partly in section, showing one of the wheels and its construction with the spring mechanism. Fig. 6 is a cross-section of the spring, taken on the line $y\ y$ of Fig. 5. Fig. 7 is a side elevation similar to Fig. 1 and showing a modification in the arrangement of the seats and illustrating the manner of increasing the carrying capacity of the vehicle. Fig. 8 is a top or plan view of the construction shown at Fig. 7. Fig. 9 is a detail view, on enlarged scale, partly in side elevation and partly in section, illustrating the manner of securing the sectional frames together to secure proper articulation and to also secure additional carrying or seating capacity. Fig. 10 is a plan view of the levers and rods employed for steering the vehicle when more than two sections are joined together.

Similar letters and numerals of reference denote like parts in the several figures of the drawings.

For the purpose of securing the desired lightness of the vehicle with the necessary strength I construct all parts of the frame of suitable tubing now known in the trade as "bicycle-tubing."

A represents the lower horizontal framework of the machine, which may be of any proportion and composed of tubing of any gage, according to the size and intended capacity of the machine.

B is the upper horizontal framework, and C is the frame of the seats, which are provided with backs D, of sheet metal or other suitable material, and upholstered, if desired.

E is the "dash-frame," composed of tubing and covered with leather or other material in the usual way. Any number of cross-braces may be used to give strength to the general construction; but I have so far found it necessary to provide only such as shown.

The horizontal frames A B of the two sections of the machine are curved, as shown at Figs. 2 and 8, in order that a greater range of articulation may be obtained. The lower frame A and upper frame B of each section are connected with vertical tubes F F', the peculiar construction of which is most plainly shown at Fig. 9.

It is immaterial which frame is provided with either of the tubes referred to, as the sole purpose of their variation is to secure an articulating-joint between the two frames.

The tube F is provided with lugs G at the upper and lower ends. These lugs may be secured in position in any suitable manner; but at Fig. 9 I have shown in section a good way, which consists in forming the lug with a tubular stem adapted to enter the end of tube F and to be brazed therein. Each end of tube F' is provided with an interior short tube H, constituting an annular shoulder, against which is located a tubular ball-race I, with a central hole for the passage of a pintle screw-rod J, screw-threaded at each end to receive a nut K, which is exteriorly threaded and cone-shaped at its inner end to constitute a track or race for antifriction-balls L. The nut K by the use of a "spanner" is run through the lug G on the ends of the tube F after the balls L have been introduced, and the pintle-rod J is put in position and secured by a washer L' and nut M. When the pintle-rod has been thus secured at one end, the balls are placed in the race I at the other end, the nut K is run through the lug G, the washer L' is applied, and the exterior jam-nut M secured upon the end of the pintle-rod. It will thus be seen that the tubes F and F' are securely connected and at the same time are free to articulate for the purpose hereinafter explained.

Extending laterally from the lower frame A of each section are short journals N, which constitute supports for the boxes O on one end of the bifurcated wheel-supports P, through which passes a short axle Q, upon which are mounted in suitable ball-bearings the wheels R. A tube or rod S, (see particularly Fig. 5,) with a suitable journal-box T at the lower end and a head T' at the upper end, is secured by nuts U to the inner cord of the axle Q, and the head T' of the rod or piston S is located within a vertical tubular receptacle V, connected with the lower and upper horizontal frames A B of the machine, as clearly shown at Figs. 1 and 7. From this described construction it will be seen that the articulation between the box T on the lower end of the piston S and the axle Q, upon which it is mounted, permits the piston in its vertical movement to compensate for the variations in the length of the arc through which it may travel under varying conditions, and if thought desirable the box T and piston S may be pivotally connected to secure proper articulations for the same purpose.

Within the hollow receptacle or vertical post of the frame is located a spring W, composed of a cylindrical rubber body having longitudinal air-cells X, closed at each end and containing air introduced by depositing liquid air and closing the end by vulcanizing in place rubber plugs, this method of inflating forming the subject-matter of another pending application relating to pneumatic tires, filed by me on the 21st day of July, 1899, Serial No. 724,682. The diameter of the spring W bears such relation to the interior diameter of the tubular receptacle V that it may be compressed longitudinally by the weight or pressure exerted upon the head T' of piston-rod S.

The peculiar construction of the spring constitutes the subject-matter of a divisional application filed by me on the 16th day of September, 1899, Serial No. 730,688.

Y is a sprocket-wheel secured to the hub of the driving-wheels and is driven by a sprocket-chain leading from a sprocket-wheel on a central driving-shaft, hereinafter described.

By reason of the pivoted connection of the bifurcated wheel-support P and the vertical reciprocatory piston S the wheels are capable of a vertical pendulum movement on the journals N as their axis. Thus each wheel is absolutely independent of every other wheel of the vehicle, and the spring movement of the vehicle is correspondingly universal and much more easy and natural than would be the case in a vehicle provided with the ordinary cumbrous and weighty steel springs. When any one of the pneumatic springs W becomes impaired or destroyed, it may be readily removed and replaced by another similar spring by simply withdrawing the piston-rod S from its tubular receptacle V.

With the articulation of the sections of the frame and the transverse articulations of the bifurcated wheel-supports P a most perfect and comfortable universal movement of the vehicle is secured.

Any preferred form of motive force may be employed to propel my improved vehicle, such force being applied, however, through the medium of a sprocket-chain to a suitable intermediate mechanism, which I will now proceed to describe, special reference being had to Figs. 3 and 4, and which is made in two parts or sections, as most clearly shown at Fig. 3, which parts are connected by metal screws 2, passing through lugs 3, cast on each end of the box. This case is also formed with journal-boxes 4 on each disk face and with sprockets 5, extended radially from one of its disk faces.

6 6 are two independent shafts which are suitably journaled in the tubular framing of the machine, and their inner ends extend through the journal-boxes 4 4 and to the interior of the case 1 and have keyed thereon sprocket-wheels 7. The outer ends of these shafts may constitute the axes of the bifurcated wheel-supports P, if deemed desirable.

8 is a transverse shaft, the ends of which are supported in boxes 9, one-half of each being integral with each of the sections of the case 1. The shaft is formed or provided with collars 10, and idler sprocket-wheels 11 are mounted on ball-bearings upon the shaft. A sprocket-chain 12, having the links pivoted at right angles to each other, as shown and described in a pending application filed by me on the 8th day of February, 1898, Serial No. 669,517, traverses the two fixed sprocket-wheels 7 on the ends of the shafts 6 6 and the two idlers 11 on the transverse shaft 8, which, it will be observed, constitutes a chord of the circular case 1, the axis of whose motion when the case is rotated is coincident with the axis of the shafts 6 6, and consequently when the case 1 is rotated by a drive-chain passing from a sprocket-wheel on any preferred motor and over the sprockets 5 on the periphery of one of the disk faces of the case the sprocket-chain 12 will rotate the sprocket-wheels 7, fixed to the inner ends of the shafts 6 6, and likewise said shafts. Near the outer ends of the shafts 6 6 and in alinement with the sprocket-wheels Y on the hubs of the driving-wheels of the machine are secured suitable sprocket-wheels which, through the medium of sprocket-chains C', transmit power and motion to the sprocket-wheels Y on the hubs of the driving-wheels. (See Figs. 1, 2, and 7.)

From the construction and arrangement of the case 1, shafts 6, 6, and 8, and the fixed sprockets 7, idler-sprockets 11, and peculiarly-constructed sprocket-chain 12 it will be obvious that the shafts 6 6 may have differential speed, and consequently when the machine travels in a curved path in turning corners the inner and outer wheels travel independently of each other and at rates of speed proportionate to the different distances they are required to travel. This condition is especially desirable in automobile carriages equipped with rubber tires.

While I have shown and described the power and motion applied to the driving-wheels through a sprocket-chain directly from the sprocket-wheels on the shafts 6 6, I desire it to be understood that I may employ any desired intermediate mechanism between the shafts 6 6 and the driving-wheels for transmitting power and motion derived from the rotation of the shafts 6 6. This may be especially desirable for the purpose of controlling or absolutely stopping the movement of the vehicle without retarding or stopping the action of the motor, which is of the highest importance when electric motive force is used as a motor, as it is well known that the efficiency of such force is greatly impaired by reducing the speed of the motor.

The brake, which controls the rotation of the box 1, consists of a rock-lever 13, pivoted centrally to the end of an arm 14, extending from the vertical frame-tube F and vibrated by a rod 15, pivoted at one end to the upper end of the lever 13 and at the forward end to a bell-crank foot-lever 16, pivoted at its lower end to the frame of the vehicle. A steel band or brake-shoe 17, surrounding the body of the box 1, is connected at one end to the pivot of the lever 13 and at the other end to the lower extremity of the vibrating lever 13, and consequently when pressure is applied to the bell-crank foot-lever 16 the rod 15 vibrates the lever 13 on its pivot or axis, forcing the lower end rearward, and in an obvious manner tightens the band or brake-shoe 17 upon the cylindrical body of the box 1.

I will now proceed to describe the mechanism by which I articulate the frames of the sections of the machine, reference being had particularly to Figs. 1, 2, 7, and 8. A rock-shaft 18 is journaled at each end in lugs 19, (see Fig. 1,) extending from the lower frame, and is provided at one or both ends with rocking levers or handles 20, keyed thereto. Each side of the center the rock-shaft is provided with rigidly-secured radial arms 21, radiating in opposite directions, as most clearly shown at Fig. 1. From the free ends of these radial arms rods 22 extend to and are connected with the curved front portion of the lower frame of the trailing or second section of the machine, as clearly shown at Fig. 2, and each side of the plane of articulation of the two sections. When the lever 20 is vibrated, the rock-shaft 18 is rocked and the fixed radial arms 21 are vibrated in opposite directions, so that one pulls upon its connecting-rod 22, while the other pushes upon the rod 22, connected therewith, and consequently a pull may be effected either side of the center to secure articulation between the tubes F F' and frames A B of the respective sections to steer the machine in either direction.

When more than two sections are articulatively connected together, I employ a modified construction of the steering mechanism and such as shown in Figs. 8 and 10 and which consists in connecting the rear ends of the bars 22 to the center of a flat bar 23, one end of which is pivoted to the front curved portion of the frame of the second section, and the outer end is connected by a rod 24 to the front curved portion of the frame of the next succeeding section, the length of the flat vibrating bar 23 being so proportioned that the pull upon the rod 22 will cause the second and third sections to articulate to the same or proper extent to produce the desired effect. This modification of the steering devices may be indefinitely employed.

I have shown at Figs. 1 and 2 a vehicle composed of two sections with the seats arranged back to back, while at Figs. 7 and 8 I have shown three sections connected together, the first two sections with the seats arranged forwardly and the rear or third section with the seat in a reverse direction; but it will be understood that the seats may be arranged forwardly on all sections, if desired, and when so arranged the upper frame B is strengthened and braced by extending the side tubing of the same downwardly in a graceful curve to and connecting it with the lower frame A and providing an upwardly and inwardly curved brace-tube Z, extending from the downwardly-curved extension of the frame B to the vertical frame-tube F', as clearly shown at Fig. 7, and constituting a "dash." In fact, the frame may be of any desired construction to secure the desired amount of strength and rigidity without departing from the spirit of my invention.

In the construction shown in the drawings I contemplate the use of twenty-four-inch wheels, such as are in common use, and the other parts of the vehicle are shown on the same scale as the wheels. Hence my improved vehicle in its complete form will of necessity be low, as compared with the ordinary automobile. Suitable steps may be secured at any desired locality to facilitate entrance and exit from the vehicle; but in the drawings I have not shown such steps, as their number and location is a matter entirely of fancy or experience.

From the foregoing description it will be obvious that I may increase the carrying capacity of my improved vehicle by simply adding sections to the full capacity of any motive force carried by the forward section and that when it is desired to increase the carrying capacity and number of sections beyond such motive force two or more sections equipped with motive power may be suitably disposed in the train of sections and that the several sections may have the steering devices connected together, as heretofore described, so that all or any number thereof may be steered by one operator.

While I have shown the seats each adapted in width to carry two persons, it will be understood that I do not wish to be limited in this respect, and while I have shown and described the vehicle as mounted upon twenty-four inch wheels and proportioned thereto it will be obvious that these details and proportions may be varied at will.

I am enabled by my invention to provide a vehicle of any capacity in width, which may be increased longitudinally (and still adding to its carrying capacity) by simply adding duplicates or replicas of the unitary structure. In other words, my improved automobile is composed of a series of units each and all alike and adapted each to subserve its unitary functions and by coaction to secure results not secured by each unit. For instance, and to illustrate my meaning, each section of my improved machine or carriage consists of only two wheels supporting a seat capable of carrying two or more passengers, so that the traction force produced by the weight of such passengers is overcome by the leverage on two wheels instead of four, or three at least, according to the present construction of automobiles, and this feature still exists, no matter to what extent the carrying capacity may be increased. For example, looking at Figs. 1 and 2, the machine carries four passengers upon four wheels, which is one wheel for each passenger, and if another section be added to such a machine its carrying capacity would be six passengers and the number of wheels would be six.

At Fig. 8 I have shown the seats extended laterally over the wheels, thus increasing the capacity of each seat and adapting it to carry three passengers. Hence such a machine would carry nine passengers on six wheels; but in each case it will be observed that the load of each seat is carried upon only two wheels.

By the use of the peculiar spring mechanism I am enabled to secure the vertical spring movement of the frame practically at two localities with reference to each wheel—viz., in a plane coincident with the axis of the wheel R and in another parallel plane vertically through the articulating point of the wheel-support P. In other words, the spring action is more nearly allied to that obtaining in the spring-seat of an easy-chair rather than to the spring action obtaining in vehicles supported upon steel springs and in which the yielding is in a single locality. In addition to this advantage in the spring action the construction permits, as heretofore stated, each wheel to adapt itself to the inequalities of the road-bed, both longitudinally and transversely, so that the horizontal equilibrium of the vehicle may be more readily preserved than in any other vehicle with which I am familiar. While all these advantages are obtained by the construction shown and described—viz., with the vertically-reciprocating piston and air-spring arranged inside of the wheel—it will be obvious that the spring and piston may be arranged outside of the wheel, or that the piston may be bifurcated to straddle the wheel and the spring arranged immediately over the wheel, and I desire it to be particularly understood that in so far as the physical movement of the wheel or wheels is concerned I do not wish to be confined to the employment of the particular kind of spring shown, as any other suitable spring may be used in lieu thereof; but I prefer the one shown and described.

I am also enabled by my invention to transmit power through two or more wheels from one source and at the same time secure independent action and differential speed between such wheels, and hence the tires of the wheels are relieved from all twisting or torsional strain, which is very destructive to rubber compounds especially.

I desire to call attention particularly to the fact referred to at the beginning of the specification, that I avoid in a great measure the unpleasant noise created by the use of ordinary chain-belt gearing. This I accomplish through the medium of peculiarly-constructed sprocket-wheels and chains, which are clearly shown in the drawings, and which, as before stated, involve the use of a sprocket-wheel with a very limited number of sprockets, the pitch-length of which is equal to an exact multiple of the pitch-length of the chain, and a chain composed of links, all of which are of uniform pitch-length, and such pitch-length an exact division of the pitch of the sprockets on the wheel, as fully described and illustrated in a divisional application filed by me on the 31st day of July, 1899, Serial No. 725,664.

In forming my improved automobile vehicle in sections, as described, and carrying the load or passengers of each section upon only two wheels it will be seen that such load or passengers are subjected to only one momentum shock instead of two, as is the case with any vehicle mounted upon three or four wheels. In connection with this feature of action and again recurring to the character of the peculiar and novel spring which I have illustrated and heretofore described, I desire to call attention to the fact that such spring cannot be so loaded that it will not subserve the purpose of taking up the momentum shock. In the first place, the rubber body W is so constructed and so proportioned relatively to the receptacle or tube within which it is located that any ordinary load or shock will not force the body of the spring out radially to a sufficient extent to bind or wedge it against the walls of the receptacle, but if heavily loaded and a momentum shock should be of such character as to cause the rubber body to expand and wedge against the walls of the receptacle the rubber body and its contained air would still act as a cushion, and the confining tube or receptacle acts to reinforce the rubber body and prevent it from injury or explosion.

Having described the construction and operation of my improved vehicle and its many advantages, what I claim as new, and desire to secure by Letters Patent, is—

1. An automobile carriage composed of sections or units each mounted at one end upon two wheels having independent axles, said sections adapted to be articulatively connected, whereby the capacity of the carriage may be increased by the addition of sections or units, substantially as described.

2. An automobile carriage composed of similar sections or units, mounted at one end upon wheels having independent axles, said sections connected together longitudinally, in combination with means whereby each section may have a vertical vibrating or pendulum movement, to adapt the several sections to any variation in the plane of the roadway, substantially as hereinbefore set forth.

3. An automobile carriage the frame of which is composed of two or more sections, each mounted at one end upon wheels having independent axles, the rear portion of the frame of the front section and the front portion of the frame of the succeeding section articulatively connected, whereby the vehicle may change its direction of travel, substantially as hereinbefore set forth.

4. In an automobile carriage, two or more frames each mounted at one end upon suitable carrying-wheels having independent axles, said frames articulatively connected in combination with means intermediate of the frames for moving said frames around the plane of articulation, substantially as and for the purpose set forth.

5. In an automobile carriage composed of sections of similar construction, an articulative connection between said frames composed of two vertical tubes or rods, one provided with a radial lug at each end and the other with a vertical pintle extending through the same and the lugs on the adjacent tube or rod, substantially as hereinbefore set forth.

6. In an automobile carriage, a front and rear frame, one provided with the vertical tube F having lugs G and the other with an interiorly-arranged ball-race at each end, in combination with a screw-threaded pintle J, balls L, interiorly and externally threaded nut K, having ball-race on the inner end, washer-nut L, and jam-nut M, substantially as and for the purposes set forth.

7. In an automobile carriage the frame or body supported over the axis of each wheel, upon an interposed spring one member of which is rigidly connected with the frame or body and each wheel connected to the frame or body at a point distant from the axis of the wheel by an arm horizontally pivoted to said frame, substantially as and for the purposes set forth.

8. In an automobile carriage, the frame or body supported over the axis of the wheels by interposed springs, one member of which is rigidly connected with the frame or body and the wheels connected to the frame or body of the carriage through a bifurcated arm O, horizontally pivoted to the frame or body at a point outside of the periphery of the wheel, substantially as and for the purposes set forth.

9. In an automobile carriage, each wheel independently connected to the frame of the carriage through the medium of a vertically-reciprocating joint one member of which is rigidly connected at one end to the frame in a plane over the axis of the wheel, and an arm extending horizontally from the axis of the wheel and pivoted horizontally to the frame outside of the periphery of the wheel, substantially as and for the purposes set forth.

10. An intermediate power-transmitting mechanism for automobiles and similar vehicles, composed of two independent shafts mounted in oppositely-arranged boxes on a hollow rotative case, the ends of the shafts within the rotative case provided with fixed sprocket-wheels, the hollow box mounted on the ends of said shafts, and provided with sprocket-teeth on its periphery, a shaft supported within the box transverse to and at one side of its rotative axis and provided with idler sprocket-wheels near each end, and a sprocket-chain composed of links pivoted alternately at right angles to each other and traversing the fixed sprockets and idlers, said intermediate mechanism being adapted for connection with both the prime mover and final mover, substantially as hereinbefore described.

11. In combination with the front and rear sections of the vehicle articulatively connected as described, a rock-shaft 18, provided with hand-lever 20 and radial arms 21, and connecting-rods 22, pivoted to the arms 21, and the frame of the rear section, substantially as and for the purpose set forth.

12. In combination with the three or more sections of the vehicle constructed and articulatively connected as described—the steering device consisting of a rock-shaft 18, lever 20, radial arms 21, connecting-rods 22, bar 23, pivoted to the front of the frame of the trailer-sections and rods 24, connected to the outer ends of bar 23, and the frame of succeeding trailing sections, substantially as and for the purpose described.

In testimony whereof I affix my signature in presence of two witnesses.

JAMES C. ANDERSON.

Witnesses:
JENNIE G. BOOTH,
JNO. IMNIE.